United States Patent
DeYoung

(10) Patent No.: US 7,126,084 B2
(45) Date of Patent: Oct. 24, 2006

(54) WELDER

(75) Inventor: Roger L. DeYoung, Franklin, TN (US)

(73) Assignee: Campbell Hausfeld/Scott Fetzer Company, Harrison, OH (US)

( * ) Notice: Subject to any disclaimer, the term of this patent is extended or adjusted under 35 U.S.C. 154(b) by 99 days.

(21) Appl. No.: 10/850,539

(22) Filed: May 20, 2004

(65) Prior Publication Data

US 2005/0258155 A1 Nov. 24, 2005

(51) Int. Cl.
*B23K 9/10* (2006.01)
(52) U.S. Cl. .................. 219/136; 219/130.1
(58) Field of Classification Search .......... 219/136, 219/130.1, 137.2
See application file for complete search history.

(56) References Cited

U.S. PATENT DOCUMENTS

| | | | |
|---|---|---|---|
| D150,358 S | 7/1948 | Hobart | |
| 2,535,946 A | 12/1950 | Mulder | |
| D161,912 S * | 2/1951 | Fotie | D15/144 |
| D176,942 S | 2/1956 | Cross | |
| 2,833,912 A | 5/1958 | Royer | |
| 2,961,527 A * | 11/1960 | Tortorella | 219/90 |
| 3,217,136 A | 11/1965 | Anderson | |
| 3,309,497 A | 3/1967 | Kensrue | |
| D210,208 S | 2/1968 | Frelin | |
| D212,536 S | 10/1968 | Diamond | |
| 3,510,623 A * | 5/1970 | Wolgast | 219/86.21 |
| D243,459 S | 2/1977 | Bliss | |
| D270,838 S | 10/1983 | Koturov | |
| D274,819 S | 7/1984 | Bouman | |
| D274,882 S | 7/1984 | Rittman | |
| D274,914 S | 7/1984 | Bouman | |
| D276,495 S | 11/1984 | Sylvia | |
| D277,636 S | 2/1985 | Rittman | |
| D289,823 S | 5/1987 | Chaney | |
| D289,995 S | 5/1987 | Armiger | |
| D297,783 S | 9/1988 | Chaney | |
| D357,263 S | 4/1995 | Soderholm | |
| D357,927 S | 5/1995 | Soderholm | |
| D411,553 S | 6/1999 | Scholl | |
| D416,030 S | 11/1999 | Weller | |
| 6,046,664 A * | 4/2000 | Weller et al. | 336/212 |
| D424,077 S | 5/2000 | Abed | |
| 6,075,226 A | 6/2000 | Kishbaugh | |
| D428,427 S | 7/2000 | Neef | |
| 6,225,596 B1 | 5/2001 | Chandler | |

(Continued)

OTHER PUBLICATIONS

Campbell Hausfeld "Operating Instructions and Parts Manual" for "Easy Spray Turbines", pp. 1-7, copyright 2000.

*Primary Examiner*—Len Tran
(74) *Attorney, Agent, or Firm*—Jones Day

(57) ABSTRACT

A portable welder includes a welder housing. The housing has front and rear vertical end surfaces and left and right side surfaces. The housing further has a horizontal top surface extending forward from the rear surface. An inclined surface faces upward and forward and extends from a front end of the top surface to a top end of the front surface. A front post, equidistant from the side surfaces, extends upward from the inclined surface. A rear post, equidistant from the side surfaces, extends upward from the top surface. A handle, spaced above the top surface, extends from the front post to the rear post. The welder is configured for a user to carry the welder by lifting the handle such that the housing is suspended from the handle by the posts.

20 Claims, 8 Drawing Sheets

U.S. PATENT DOCUMENTS

| | | |
|---|---|---|
| D446,796 S | 8/2001 | Rose |
| 6,396,019 B1 | 5/2002 | Williams |
| 6,479,795 B1 | 11/2002 | Albrecht |
| D467,257 S | 12/2002 | Anderson |
| D471,572 S | 3/2003 | Cziraky |
| D482,376 S | 11/2003 | Jeter |
| 6,818,860 B1 * | 11/2004 | Stava et al. ............... 219/130.1 |
| 6,897,406 B1 * | 5/2005 | Crisler et al. ............ 219/130.1 |
| 2002/0003134 A1 | 1/2002 | Podgurski |
| 2003/0136773 A1 | 7/2003 | Bogner |

* cited by examiner

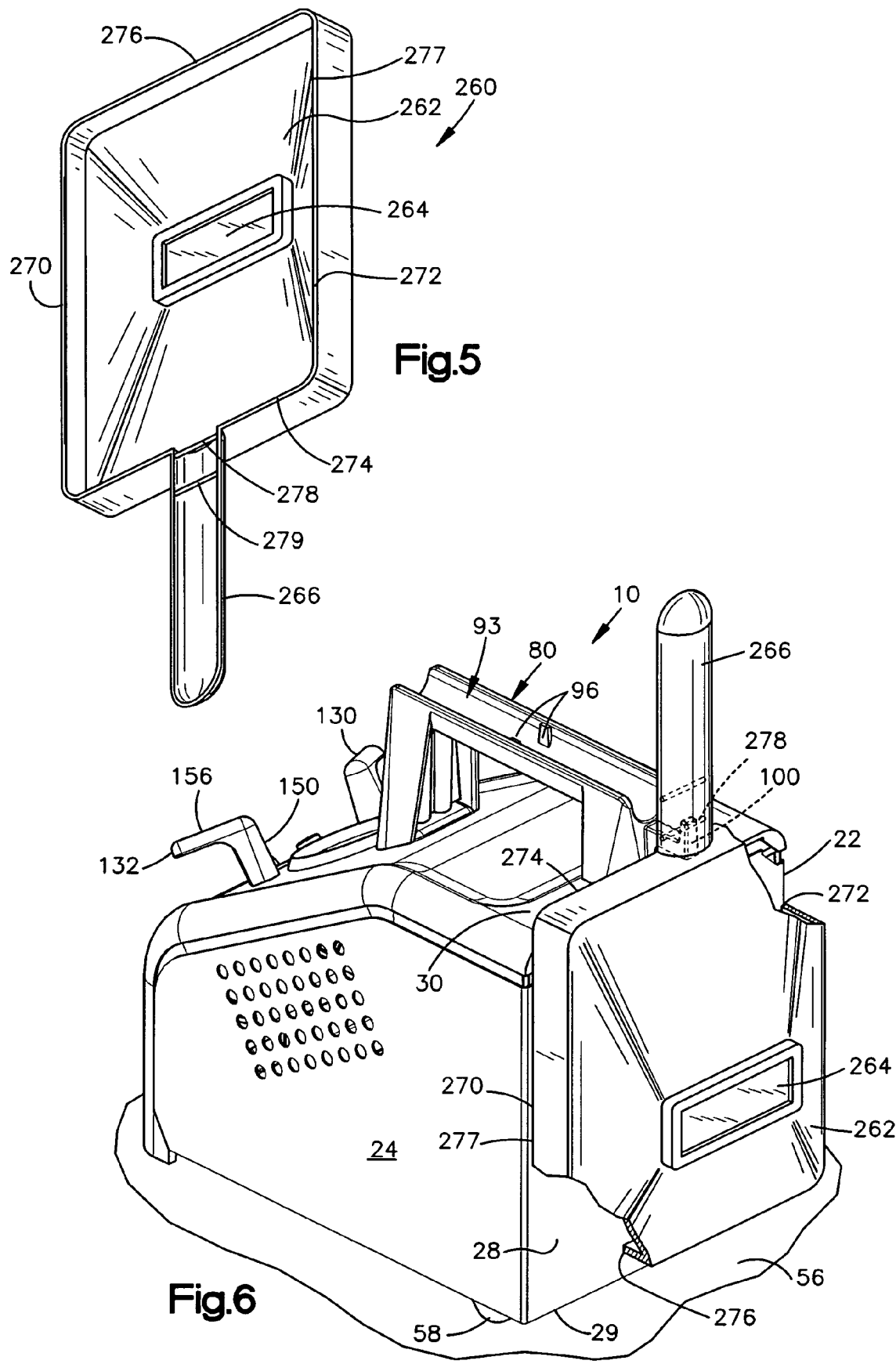

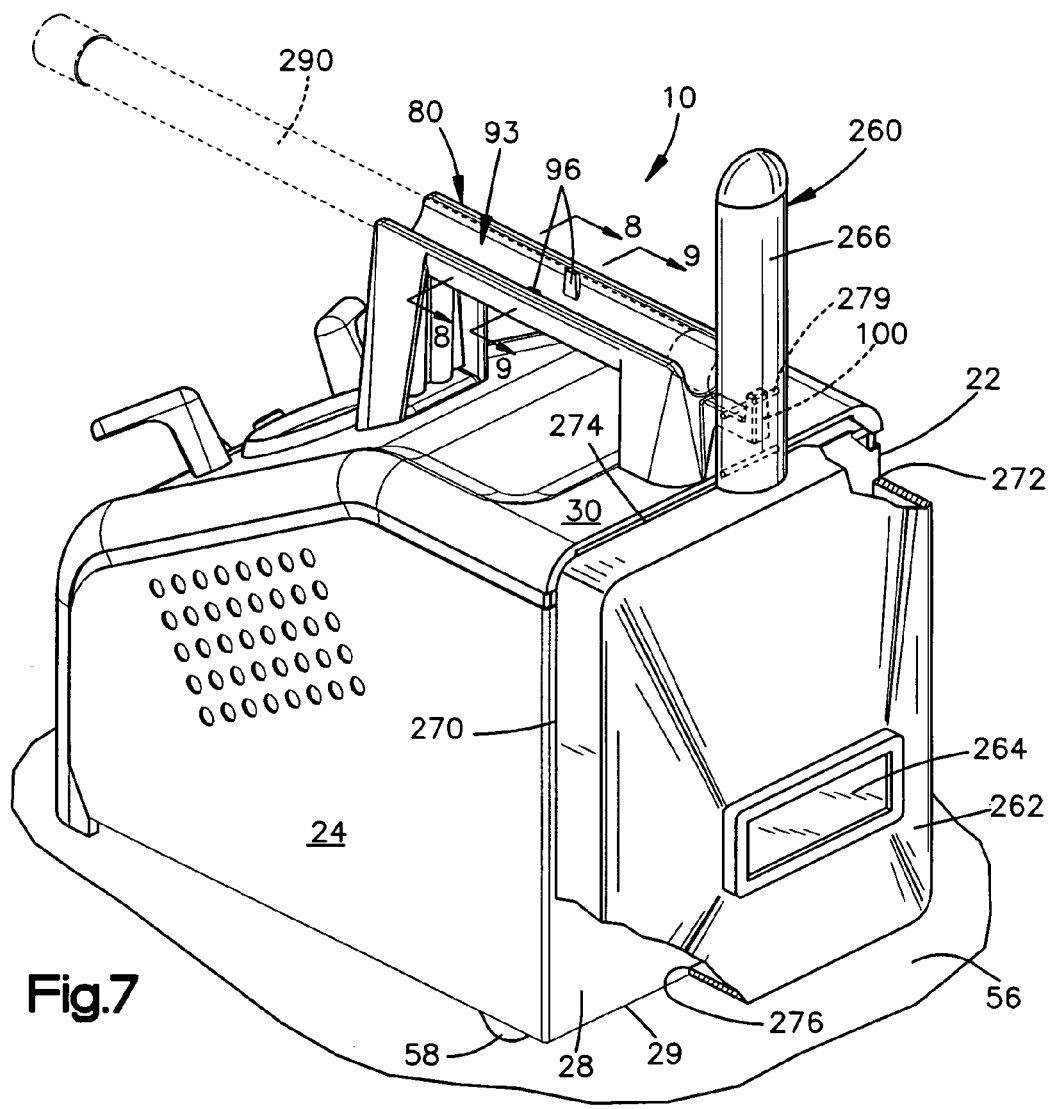
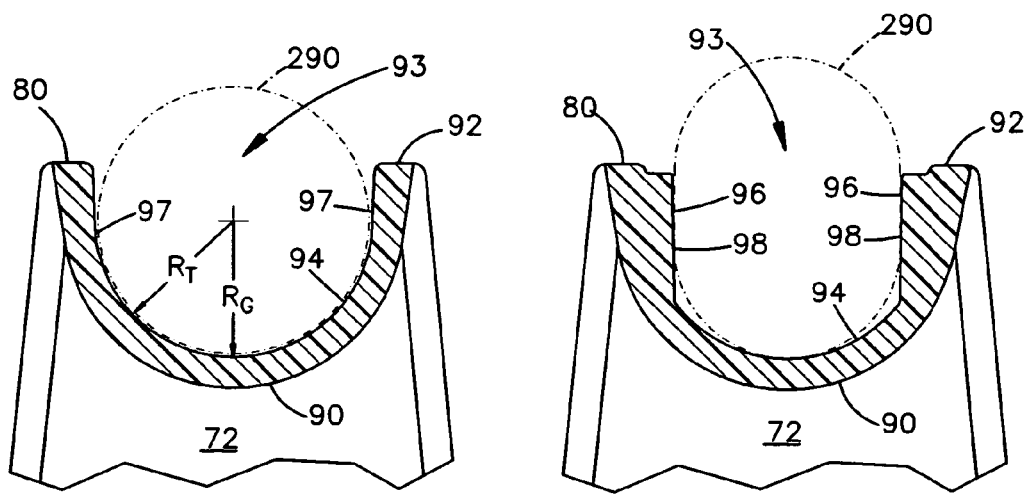

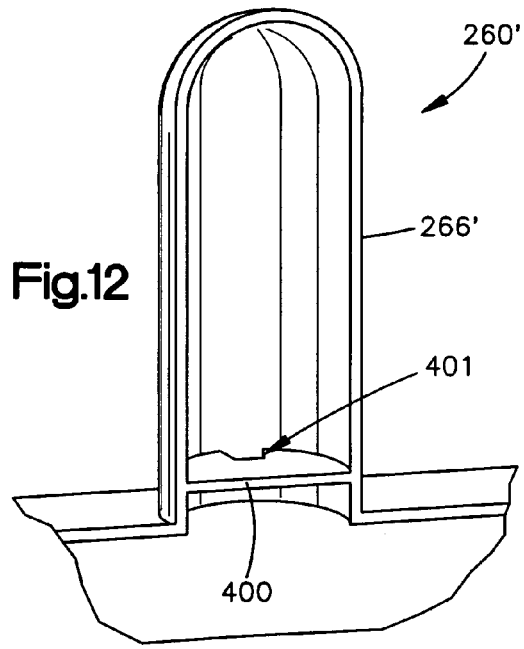
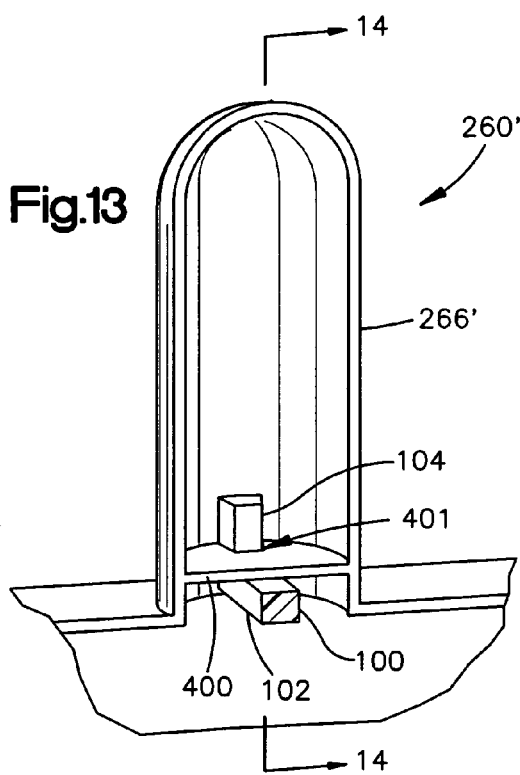
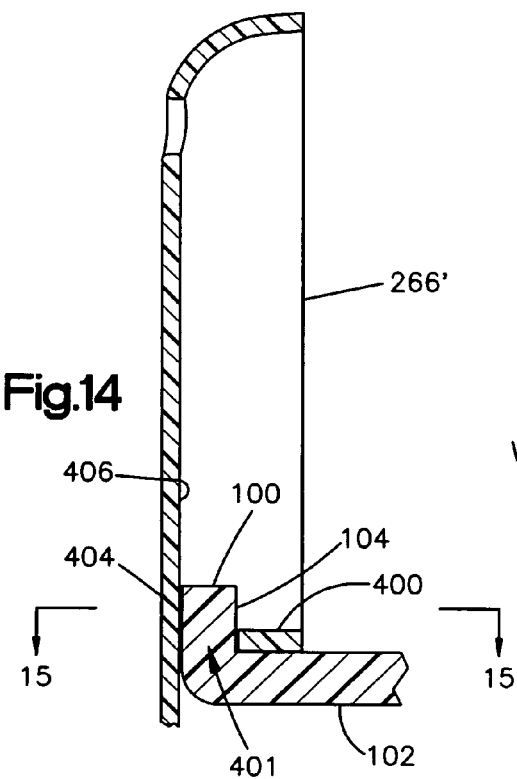
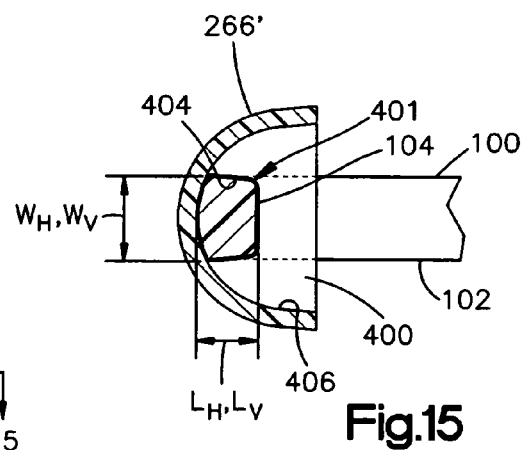

WELDER

TECHNICAL FIELD

This application relates to electric welders.

BACKGROUND

Welding is a process of melting a filler metal for repairing or bonding metal work pieces. The heat needed to melt the metal can be produced by an electrical current provided by a welder. The welder includes a current source, such as a transformer, housed in a housing. The current is conducted from the source to the workpiece by cables protruding from the housing.

SUMMARY

A portable welder comprises a welder housing. The housing has front and rear vertical end surfaces and left and right side surfaces. The housing further has a horizontal top surface extending forward from the rear surface. An inclined surface faces upward and forward and extends from a front end of the top surface to a top end of the front surface. A front post, equidistant from the side surfaces, extends upward from the inclined surface. A rear post, equidistant from the side surfaces, extends upward from the top surface. A handle, spaced above the top surface, extends from the front post to the rear post. The welder is configured for a user to carry the welder by lifting the handle such that the housing is suspended from the handle by the posts.

A welding apparatus comprises a welder housing having front and rear surfaces and two opposite side surfaces. Front and rear posts, each equidistant from the side surfaces, extend upward from the housing. A handle, spaced above the housing, extends lengthwise from the front post to the rear post. A user can carry the welder by lifting the handle such that the housing is suspended from the handle by the posts. The handle has a groove extending along the length of the handle and extending downward from a top of the handle. The handle, the posts and the housing are parts of a portable welder. A welding accessory is for use with the welder. It is configured to be seated in the groove such that a user can grasp the handle and the accessory together and transport the accessory along with the welder.

BRIEF DESCRIPTION OF THE DRAWINGS

FIG. 5 is a perspective view of a welding shield;
FIG. 6 is a perspective view of the welding shield mounted on the welder in a first configuration;
FIG. 7 is a perspective view of the welding shield mounted on the welder in a second configuration, and a tube for holding welding rods also mounted on the welder;
FIG. 8 is a sectional view taken at line 8—8 of FIG. 7;
FIG. 9 is a sectional view taken at line 9—9 of FIG. 7;
FIG. 12 is a perspective view of another welding shield;
FIG. 13 is a view similar to FIG. 12, showing the other welding shield mounted on the welder;
FIG. 14 is a view taken at line 14—14 of FIG. 13;
and
FIG. 15 is a view taken at line 15—15 of FIG. 14.

DESCRIPTION

Figure 1:
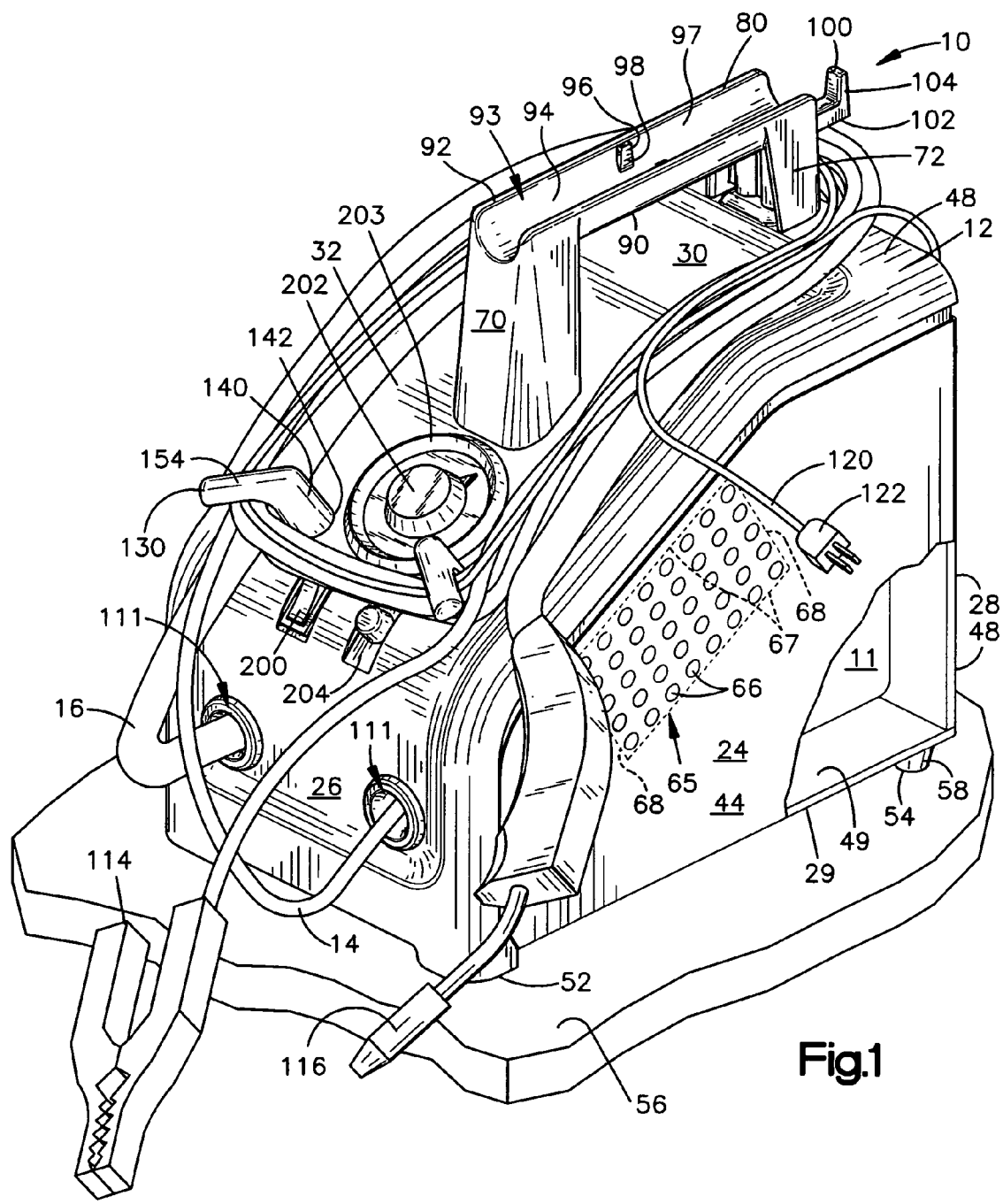
FIG. 1 is a perspective view of a welder.

The apparatus 10 shown in FIG. 1 has parts that are examples of the elements recited in the claims.

The apparatus 10 is a portable electric welder. The welder 10 is used to provide electrical current for welding metal to a workpiece. The welder 10 includes a current source 11, such as a transformer, housed in a housing 12. The welding current is conducted from the source 11 to the workpiece by first and second cables 14 and 16 protruding from the housing 12.

Figure 2:
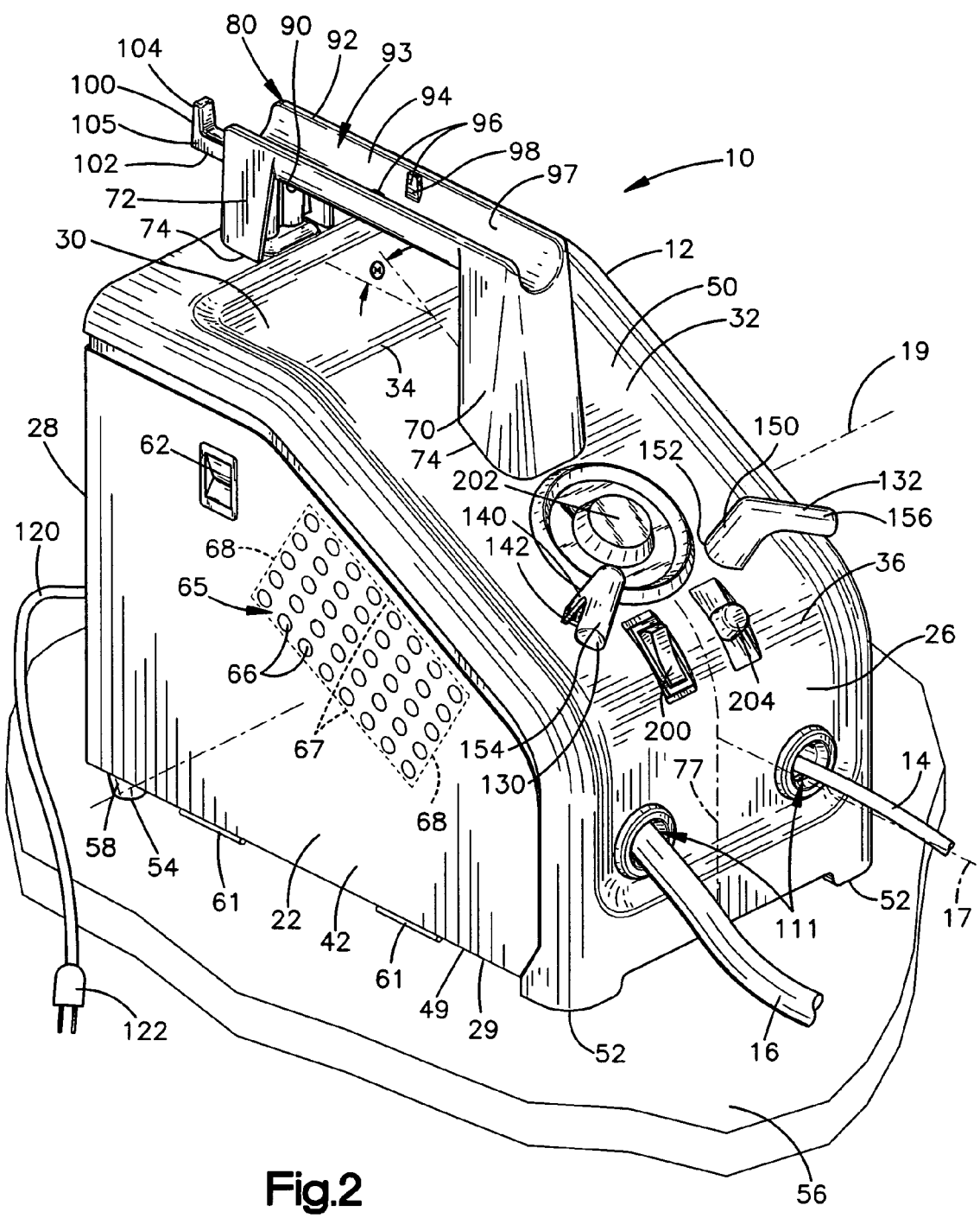
FIG. 2 is a different perspective view of the welder, with a panel of the welder shown in a closed position.
Figure 3:
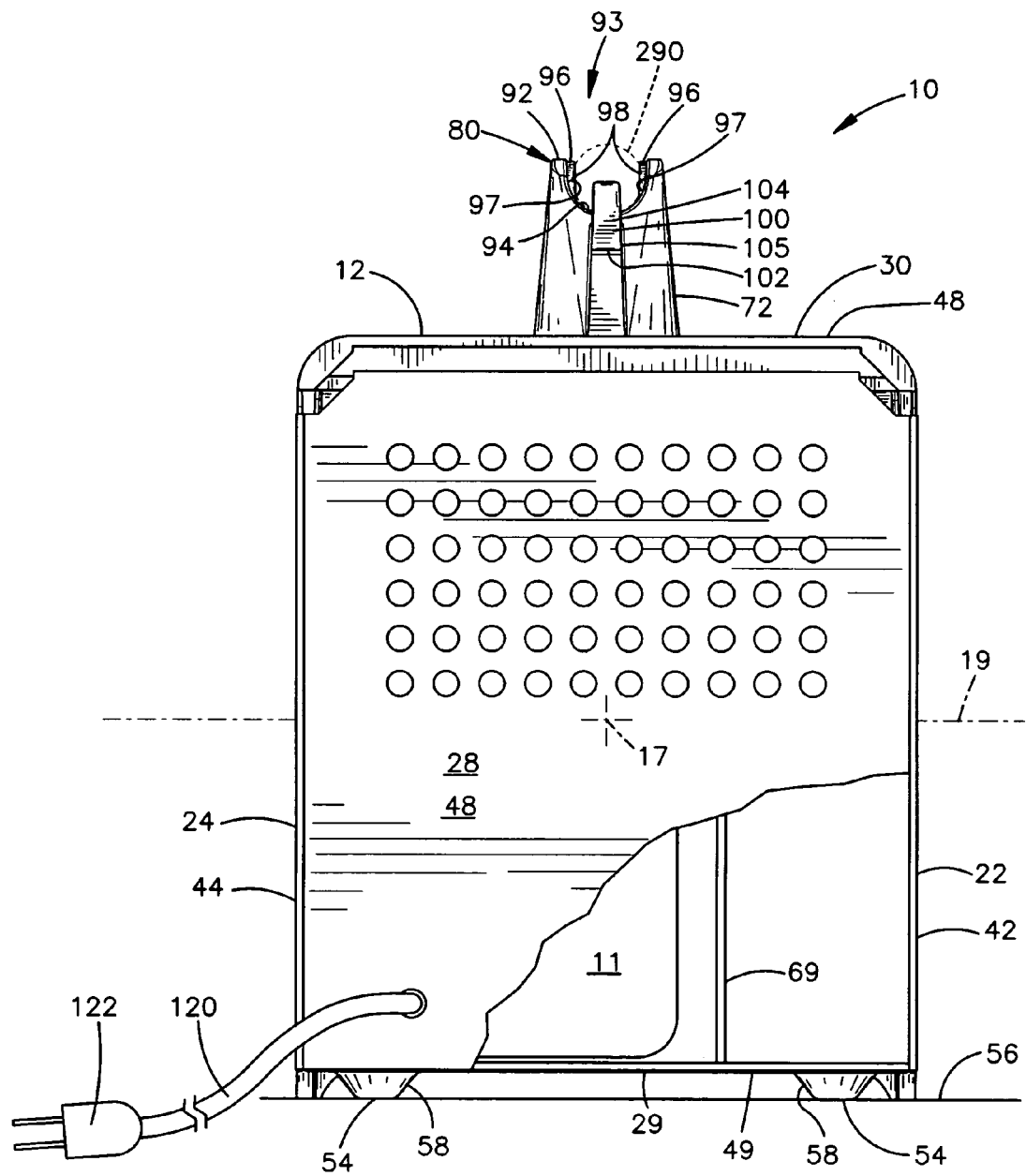
FIG. 3 is a rear view of the welder.

Referring to FIGS. 1–3, the housing 12 bisects a longitudinal axis 17 and a lateral axis 19. The housing 12 has left and right vertical side surfaces 22 and 24 laterally opposite each other and front and rear vertical end surfaces 26 and 28 longitudinally opposite each other. The housing 12 further has a horizontal bottom surface 29. A horizontal top surface 30 extends forward from the rear surface 28. An inclined surface 32 faces upward and forward and extends from a front end 34 of the top surface 30 to a top end 36 of the front surface 26.

The left, right, rear and bottom surfaces 22, 24, 28 and 29 are defined by left, right, rear and bottom walls 42, 44, 48 and 49. Each wall 42, 44, 48 and 49 comprises a separate flat panel of sheet metal. In contrast, the top, inclined and front surfaces 30, 32 and 26 surfaces are defined by a single cover panel 50 of molded plastic.

The housing 12 has two front support surfaces 52 and two rear support surfaces 54, which are the four lowest surfaces of the housing 12. The support surfaces 52 and 54 are configured to support the welder 10 on a tabletop 56, with the welder 10 resting on the tabletop 56. In this example, the front support surfaces 52 are bottom surfaces of the cover panel 50. The rear support surfaces 54 are bottom surfaces of downward protrusions 58 in the bottom panel 49.

Figure 4:
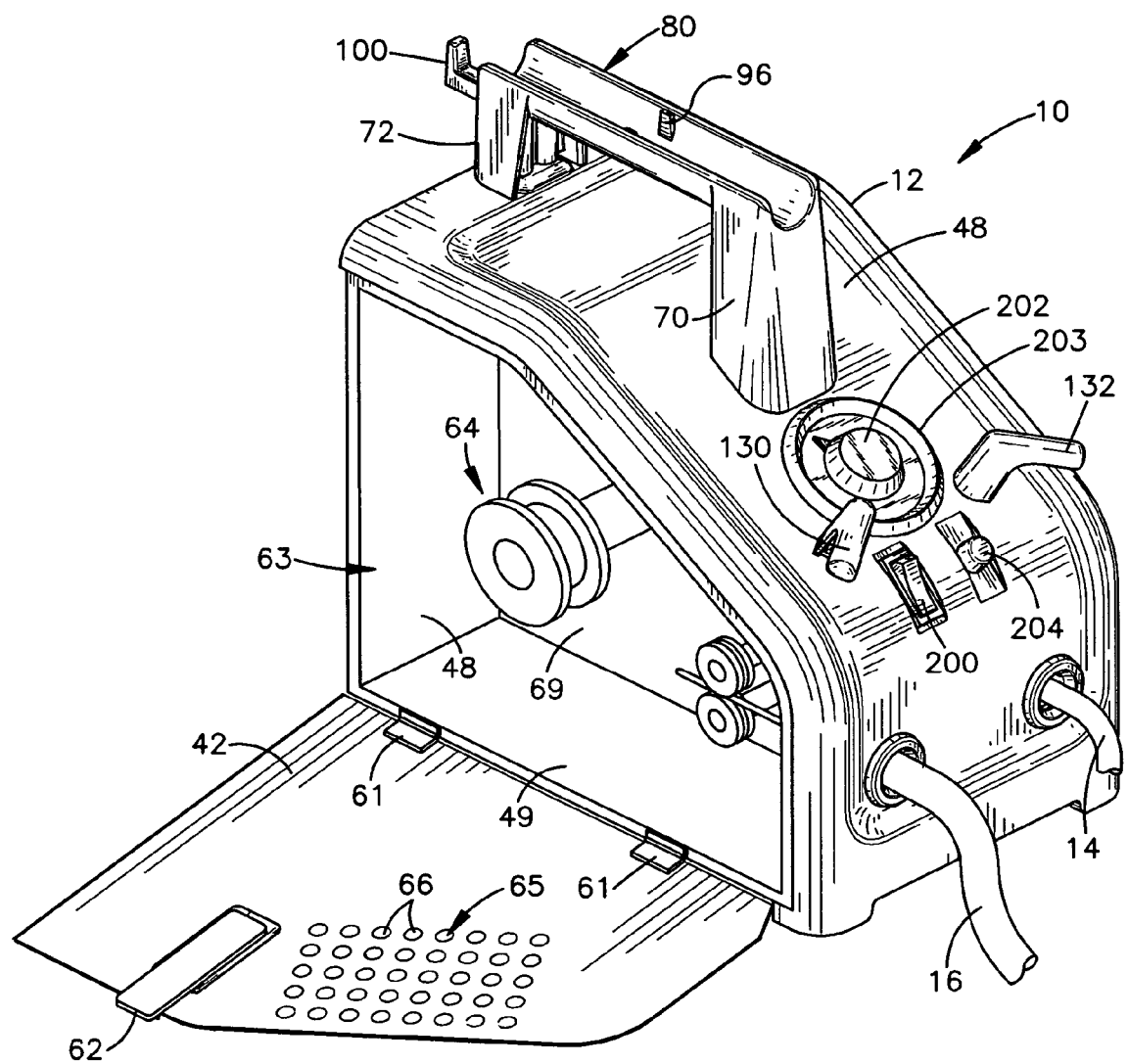
FIG. 4 is a view similar to FIG. 2, with the panel shown in an open position.

As shown in FIG. 2, the left panel 42 is pivotably attached to the bottom panel 49 by hinges 61. The left panel 42 is latched in a closed position by a latch 62. As shown in FIG. 4, the left panel 42 can be unlatched and swung open about the hinges 61. This provides access to a chamber 63 and a wire feed mechanism 64 within the chamber 63 for a user to mount a spool of welding wire on the mechanism 64.

As shown in FIGS. 1 and 2, each side surface 22 and 24 has an array 65 of holes 66 located below the inclined surface 32. The arrays 65 are alike. Each array 65 has a rectangular shape defined by two opposite longer edges 67 and two opposite shorter edges 68, indicated by dashed lines. The longer edges 67 are parallel to the inclined surface 32, and the shorter edges 68 are perpendicular to the inclined surface 32. The longer and shorter edges 67 and 68 are thus inclined relative to horizontal. Both arrays 65 are ornamental. The array 65 on the right surface 24 is also functional, in that it vents heat from the transformer 11 to outside the housing 12. In contrast, the array 65 on the left surface 22 is not functional, since it is isolated from the transformer 11 by an internal wall 69 (FIG. 4).

Front and rear handle-supporting posts 70 and 72 are shown in FIG. 2. Each post 70 and 72 is equidistant from the side surfaces 22 and 24. They extend upward from respective front and rear locations 74 and 76. The front location 74 is on the inclined surface 32. The rear location 76 is on the top surface 30. These locations 74 and 76 are located on an imaginary centerline 77 extending along the top, inclined and front surfaces 30, 32 and 26, equidistant from the side surfaces 22 and 24.

A handle 80 extends longitudinally from the front post 70 to the rear post 72, and is spaced above the top surface 30. The welder 10 is configured for a user to carry the welder 10 by lifting the handle 80, with the housing 12 suspended from the handle 80 by the two posts 70 and 72. This is facilitated by some point on the handle 80 being located directly above the center of gravity of the welder 10. Preferably, the handle 80 is laterally centered on that point. It is further facilitated by the handle 80 and the posts 70 and 72 being laterally centered, at least approximately, between the side surfaces 22 and 24. Since the handle 80 is longitudinally extending, when the user grasps the handle 80 and carries the welder 10 at his side, the welder 10 will be naturally suspended in an orientation in which the housing front surface 26 faces either the same or opposite direction that the user is facing.

The handle 80 has bottom and top surfaces 90 and 92. The bottom surface 90 substantially semicylindrical to be comfortably grasped by the user's fingers. The top surface 92 is interrupted by a groove 93 in the handle 80, extending longitudinally along the length of the handle 80. The groove 93 is defined by a groove surface 94 extending downward from the top surface 92 of the handle 80. The groove surface 94 includes a semi-cylindrical shape. A pair of nubs 96 project laterally inward from laterally opposite sides 97 of the groove surface 94. Each nub 96 has a vertical surface 98 facing and spaced from the opposite nub 96.

An accessory hook 100 has horizontal and vertical legs 102 and 104. The horizontal leg 102 extends rearward from the rear post 72 and is higher than the top surface 30. The vertical leg 104 extends upward from a rear end 105 of the horizontal leg 104. The vertical leg 104 is located directly behind the handle groove 93.

Referring to FIG. 1, the first and second welding cables 14 and 16 are connected to the transformer 11. From the transformer 11, the cables 14 and 16 extend through two holes 111 in the front surface 26 of the housing 12 to outside the housing 12. Outside the housing 12, the first cable 14 is connected to a ground clamp 114 for attaching to a metal workpiece. The second cable 16 is connected to an electrode holder 116, in this case a wire-feed gun. Two sockets can be installed in the two holes 111 and connected to the transformer 11. In that case, the cables 14 and 16 would not be connected directly and permanently to the transformer 11 as shown, but would rather terminate at plugs that can be removably plugged into the sockets.

A power cord 120 provides electrical power to the transformer 11. The power cord 120 protrudes from the rear housing surface 28 and has a wall plug 122 at its distal end.

Left and right cord-wrap hooks 130 and 132 are shown in FIG. 2. The hooks 130 and 132 are located in front of the posts 70 and 72 and respectively to the left and to the right of the posts 70 and 72. The left hook 130 has a proximal leg 140 projecting perpendicularly from the inclined surface 32 from a location 142 on the inclined surface 32 that is to the left of the posts 70 and 72 and the center line 77. Similarly, the right cord-wrap hook 132 has a proximal leg 150 projecting perpendicularly from the inclined surface 32, from a location 152 on the inclined surface 32 that is to the right of the posts 70 and 72 and the center line 77.

The hooks 130 and 132 further have respective distal legs 154 and 156 extending perpendicularly from the respective proximal legs 140 and 150. Each distal leg 154 and 156 extends in a direction that is both forward and away from the center line 77 and the opposite hook 130 or 132. The hooks 130 and 132 are mirror images of each other about a vertical plane through the centerline 77. In this example, the proximal and distal legs 130, 132, 154 and 156 are straight, but they can be curved. In this example, the proximal and distal legs 130, 132, 154 and 156 meet at a distinct elbow and at a right angle, but that is not required.

As shown in FIG. 1, the cord and cables 120, 14 and 16 can be wrapped about the rear post 72 and the cord-wrap hooks 130 and 132. The cord and cables 120, 14 and 16 are supported from below by the top and inclined surfaces 30 and 32. They are captured from above by the horizontal leg 102 of the accessory hook 100 and the distal legs 154 and 156 (FIGS. 1 and 2) of the cord-wrap hooks 130 and 132. This prevents the wrapped cord and cables 120, 14 and 16 from slipping upward and off the rear post 72 and the cord-wrap hooks 130 and 132.

The welder 10 has manual controls for manually controlling an operating condition of the welder 10. As shown in FIG. 2, one such control is a power switch 200 for manually switching the welder 10 on and off.

Another such control is a rotary control knob 202 for manually adjusting the welding current. The knob 202 can alternatively adjust speed of the wire feed 65 (FIG. 4). The knob 202 is located in front of and below the front post 72 and is centered on the centerline 77. The cord-wrap hooks 130 and 132 are located forward and laterally away from the rotary knob 202 so as to keep the wrapped cord and cables 120, 14 and 16 spaced radially away from the rotary control knob 202.

A circularly extending ridge 203 in the inclined surface 32 surrounds, and is centered about, the knob 202. The ridge 203 is ornamental. It is also functional in that it can impede small debris sliding down the inclined surface 32 from contacting the knob 202.

The welder 10 can also have indicators. In this example, the welder 10 has only one indicator, a thermal shutoff light 204. This indicator 204 lights when the welder 10 is temporarily shut off by a thermal protection circuit in the welder 10.

The controls and indicator 200, 202 and 204 and are all positioned on the inclined surface 32. This facilitates viewing and accessing of the controls and indicator 200, 202 and 204. That is because the inclined surface 32 faces the user's eyes more directly than the vertical and horizontal surfaces 22, 24, 26, 28 and 30 when the user is standing in front of the welder 10 while using it. The inclined surface 32 thus serves as a control panel. For convenient accessibility, the control panel 32 is inclined at an angle θ relative to the horizontal top surface 30 of preferably 25–50 degrees, and more preferably 25–35 degrees.

The holes 111 from which the cables 14 and 16 protrude through the housing 12 are located on the front panel 26, which is just below the control panel 32. This is for holes 111 to face a user standing in front of the welder 10. This is additionally for the holes 111 to be below the control panel 32, to avoid the cables 14 and 16 draping over the controls and indicator 200, 202 and 204.

A variety of welding accessories can be used with the welder 10. One such accessory is a shield 260 shown in FIG. 5. The shield 260 comprises a pan-shaped shield plate 262, with a dark tinted window 264, and a handle 266. The shield plate 262 has four peripheral edges comprising two side edges 270 and 272, a proximal edge 274 and a distal edge 276 that together define a rectangular periphery 277. The handle 266 extends from the proximal edge 274 in a direction away from the distal edge 276. The handle 266 is parallel to the side edges 270 and 272 and centered between them.

The shield 260 further has two attachment structures 278 and 279, in this case two rods. They are configured, independently of each other, to be hooked onto the accessory hook 100 (FIG. 1). The first rod 278 is located in the handle 266, near the shield plate 262. The second rod 279 is also located in the handle 266, but farther from the shield plate 262 than the first rod 278.

As shown in FIG. 6, hooking of the first attachment structure 278 onto the accessory hook 100 suspends the shield 260 in a first orientation in which the shield plate 262 hangs downward from the hook 100. This orientation is characterized by the following features: The shield handle 266 extends upward from the hook 100. The four peripheral edges 270, 272, 274 and 276 of the shield plate 262, and thus the rectangular periphery 277 of the shield plate 262, are parallel to the rear surface 28 and spaced above the tabletop 56. One shield side edge 272 is coplanar with the left housing surface 22. The other shield side edge 270 is coplanar with the right housing surface 24. The proximal and distal edges 270 and 276 are horizontal.

Hooking of the second attachment structure 279 onto the accessory hook 100 suspends the shield 260 in a second orientation, shown in FIG. 7. The second orientation has the same characteristics mentioned above for the first orientation (FIG. 6). But the second orientation has the additional characteristics that the shield proximal edge 274 is coplanar with the housing top surface 30, and the shield distal edge 276 is coplanar with the housing bottom surface 29. This is in contrast with the first orientation (FIG. 6) in which the proximal edge 274 is higher than the top surface 30 and the distal edge 276 is higher than the bottom surface 29.

Another welding accessory is a tube 290 for holding welding rods. The tube 290 can be seated in the handle groove 93 as shown in FIG. 7. This enables a user to grasp the welder handle 80 and the tube 290 together and transport the tube 290 along with the welder 10. As shown in FIG. 3, the vertical leg 104 of the hook 100 is located directly behind the handle groove 93. The vertical leg 104 thus abuttingly limits rearward movement of the tube 290 seated in the groove 93.

To prevent wobbling of the tube 290 within the groove 93, the outer surface of the tube 290 has a shape that matches the shape of the groove surface 94. As shown in FIG. 8, the tube 290 is cylindrical, with a radius $R_T$ equal to a radius $R_G$ of the groove surface 94. Thus, in cross-section, the tube 290 and the groove 93 include semi-cylindrical shapes of equal radii $R_T$ and $R_G$ that engage each other along a continuous curve. If the tube 290 is flexible, the tube radius $R_T$ can be slightly greater then the groove radius $R_G$. The tube 290 can then to be pressed into the groove 93 and retained in place by friction with the groove surface 94. As shown in FIG. 9, the vertical surfaces 98 of the nubs 96 pinch the tube 290 to secure it in place.

Figure 10:
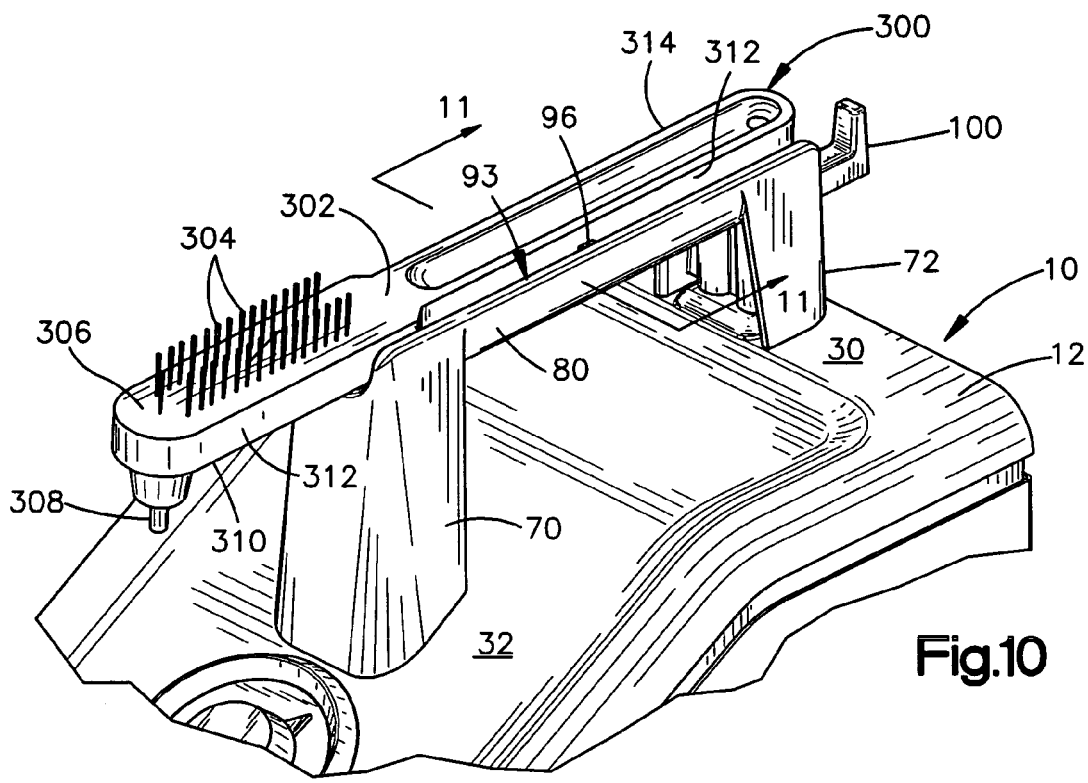
FIG. 10 is a perspective view of a welding brush mounted on the welder.

Another welding accessory is a welding brush 300 shown in FIG. 10. The brush 300 includes a bar 302. Bristles 304 project from a front surface 306 of the bar 302. A chipping head 308 projects from a rear surface 310 of the bar 302. Two opposite side surfaces 312 extend from the front surface 306 to the rear surface 310.

Figure 11:
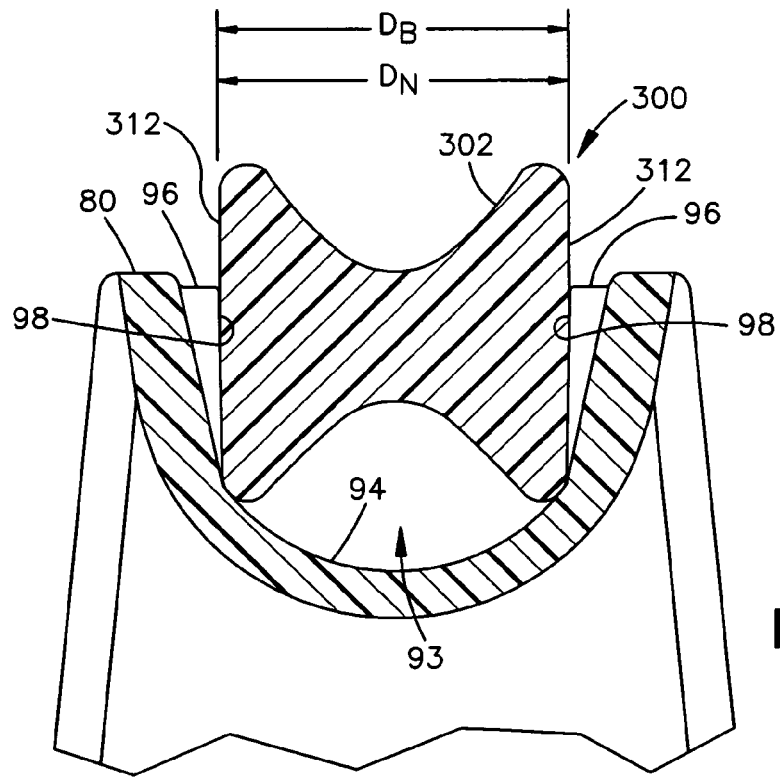
FIG. 11 is a sectional view taken at line 11—11 of FIG. 10.

The brush 300 can be placed in the handle groove 93 as shown in FIGS. 10 and 11. This enables a user to grasp the welder handle 80 and the brush 300 together, to transport the brush 300 along with the welder 10. To prevent the brush 300 from wobbling in the groove 93, a distance $D_B$ between the side surfaces 312 of the brush 300 equals the distance $D_N$ between the laterally-inward facing surfaces 98 of the nubs 96. Alternatively, if the brush 300 or handle 80 is flexible, the distance $D_B$ between the brush side surfaces 312 when uncompressed can be slightly greater than the distance $D_N$ between the nub surfaces 98. In that case, the brush 300 is pinched by and between the nubs 96 to secure it in place.

FIG. 12 shows a second shield 260', similar to the shield 260 (FIG. 5) described above. The second shield 260' differs from the first shield 260 in the configuration of its attachment structure. The attachment structures of the first shield (FIG. 5) are rods 278 and 279. In contrast, the attachment structure of the second shield 260 is a flange 400 with a hole 401, attached to a handle 266' of the shield 260'. As shown in FIGS. 13–14, when the shield 260' is suspended from the hook 100, the hole 401 receives the vertical leg 104 of the hook 100, and the flange 400 rests on the horizontal leg 102.

To help stabilize the shield 260 as it is suspended on the hook 100, the hole 401 preferably has the following features. As shown in FIG. 15, the length $L_H$ of the hole 401 equals, at least approximately, the length $L_V$ of the cross-sectional profile of the vertical leg 104. The width $W_H$ of the hole 401 equals, at least approximately, the width $W_V$ of the cross-sectional profile of the vertical leg 104. The hole 401 has a size and shape that closely matches the size and shape of the cross-sectional profile of the vertical leg 104. The hole 401 closely receives the vertical leg 104, which prevents horizontal movement of the attachment structure 400 relative to the hook 100. Due to the close fit, a rear surface 404 of the vertical leg 104 is constrained to engage the inner surface 406 of the handle 266' along the height of the vertical leg 104. This prevents the shield plate 262 from swinging rearward while suspended from the hook 100.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have elements that do not differ from the literal language of the claims, or if they include equivalent structural elements with insubstantial differences from the literal language of the claims.

The invention claimed is:

1. A portable welder comprising:
   a welder housing having front and rear vertical surfaces, left and right vertical side surfaces, a horizontal top surface extending forward from the rear surface, and an inclined surface extending from a front end of the top surface to a top end of die front surface;
   a front post, equidistant from the side surfaces, extending upward from the inclined surface;
   a rear post, equidistant from the side surfaces, extending upward from the top surface; and
   a handle, spaced above the housing, extending from the front post to the rear post, and configured for a user to carry the welder by lifting the handle such that the housing is suspended from the handle by the two posts.

2. The welder of claim 1 further comprising an accessory hook for suspending a welding accessory, extending rearward and upward from the rear post.

3. A welding apparatus comprising:
   a welder housing having front and rear surfaces and two opposite side surfaces;
   front and rear posts, each equidistant from the side surfaces, extending upward from the housing;

a handle, spaced above die housing, extending lengthwise from the front post to the rear post for a user to carry the welder housing by lifting the handle such that the housing is suspended from the handle by the posts, the handle having a groove extending along the length of the handle and extending downward from a top of the handle, with the handle, the posts and the housing being parts of a portable welder;

a welding accessory for use with the welder, configured to be seated in the groove such that a user can grasp the handle and the accessory together and transport the accessory along with the welder; and a securing structure connected to handle and configured to secure the accessory in place in the groove.

4. The apparatus of claim 3 wherein the groove and the welding accessory have semicircular cross-sections with equal radii.

5. A portable welder comprising:

a welder housing having front and rear vertical end surfaces, left and right side surfaces, a horizontal top surface extending forward from the rear surface, and an inclined surface facing upward and forward and extending from a front end of the top surface to a top end of the front surface;

a welding cable protruding from the housing;

a post extending upward from the top surface and equidistant front the side surfaces;

left and right cord-wrap hooks located respectively to the left and to the right of the post, each hook having a proximal leg projecting perpendicularly from the inclined surface and a distal leg extending perpendicularly from the proximal leg;

the post and the hooks being together configured for the cable to he wrapped about the post and the hooks, with the cable supported from below by the top and inclined surfaces and captured from above by the distal legs of the cord-wrap hooks.

6. The welder of claim 5 further comprising an accessory hook comprising a horizontal leg extending rearward from the post and a vertical leg extending upward from the horizontal leg, the accessory hook being configured for suspending a welding accessory and for capturing the cable from above when the cable is wrapped about the post and the cord-wrap hooks.

7. The welder of claim 5 further comprising a welder control located on the inclined surface, equidistant from the side surfaces, wherein the cord-wrap hooks are located so as to keep the cord spaced away from the welder control when the cord is wrapped about the post and the hooks.

8. The welder of claim 5 further comprising a handle spaced above the housing and extending forward from the post to another post that extends upward from the housing.

9. A portable welder comprising:

a welder housing having front and rear vertical end surfaces and left and right side surfaces;

front and rear posts, each equidistant from the side surfaces, extending upward from the housing;

a handle extending lengthwise from the front post to the rear post for a user to carry the welder by lifting the handle such that the housing is suspended from the handle by the two posts; and an accessory hook for suspending a welding accessory, comprising a horizontal leg extending rearward from the rear post and a vertical leg extending upward from the horizontal leg.

10. A portable welder comprising:

a welder housing having front and rear vertical end surfaces and left and right side surfaces;

front and rear posts, each equidistant from the side surfaces, extending upward from the housing;

a handle extending lengthwise from the front post to the rear post for a user to carry the welder by lifting the handle such that the housing is suspended from the handle by the two posts; and an accessory hook for suspending a welding accessory, comprising a horizontal leg extending rearward from the rear post and a vertical leg extending upward from the horizontal leg;

the handle having a groove extending along the length of the handle and extending downward from a top of the handle and into which a tubular welding accessory can be seated such that a user can grasp the handle and the accessory together and transport the accessory along with the welder.

11. The welder of claim 10 wherein the vertical leg of the hook is located so as to abuttingly limit rearward movement of the tubular welding accessory seated in the groove.

12. A welding apparatus comprising:

a portable welder including a housing, a post and a book, the housing having front and rear end surfaces and left and right side surfaces, the post extending upward from the housing equidistant from the side surfaces, and the hook having a horizontal leg extending rearward from the post and a vertical leg extending upward from the horizontal leg; and a welding shield including two peripheral side edges and two peripheral end edges that together define a rectangular periphery of the shield, and further including an attachment structure;

the shield having a mounted position in which the attachment structure is hooked onto the hook, suspending the shield in an orientation in which the rectangular periphery is behind and parallel with the rear surface, one of the side edges is coplanar with the left surface of the housing, and the other side edge is coplanar with the right surface of the housing.

13. The apparatus of claim 12 wherein the housing further has a horizontal top surface, and, in the mounted position of the shield, one of the end edges is coplanar with the top surface.

14. The apparatus of claim 13 wherein the attachment structure comprises a flange with a hole configured to closely receive the vertical leg in the mounted position of the shield.

15. The apparatus of claim 13 wherein the flange is adjoined to an inner surface of the handle such that the hole is defined by both the flange and the inner surface of the handle.

16. A welding apparatus comprising:

a welder housing;

a hook having a horizontal leg projecting away from the housing and a vertical leg extending upward from the horizontal leg; and a welding shield comprising a shield plate, a handle and an attachment structure, the attachment structure comprising a flange with a hole that closely receives the vertical leg;

the shield having a mounted position in which the attachment structure is hooked onto the hook, with the hole closely receiving the vertical leg, the flange resting on the horizontal leg, the shield plate suspended downward, and the handle extending upward.

17. The apparatus of claim 16 wherein the flange is adjoined to an inner surface of the handle such that the hole is defined by both the flange and the inner surface of the handle.

18. The apparatus of claim 17 wherein the close fit of the vertical leg in the hole constrains the vertical leg of the hook to engage the inner surface of the handle.

19. A portable welder comprising:
a welder housing having front and rear vertical end surfaces, left and right side surfaces, a horizontal top surface extending forward from the rear surface, and an inclined surface facing upward and forward and extending from a front end of the top surface to a top end of the front surface;
a front post, equidistant from the side surfaces, extending upward from the inclined surface;
a rear post, equidistant from the side surfaces, extending upward from the top surface;
a handle, spaced above the housing, extending from the front post to the rear post, and configured for a user to carry the welder by lifting the handle such that the housing is suspended from the handle by the two posts;
a left cord-wrap hook having a proximal leg projecting from a location on the inclined surface that is to the left of the posts and a distal leg extending from the proximal leg; and
a right cord-wrap hook having a proximal leg projecting from a location on the inclined surface that is to the right of the posts and a distal leg extending from the proximal leg;
the rear post and the cord-wrap hooks being configured for a cable to be wrapped about the rear post and the proximal legs, with the cable supported from below by the top and inclined surfaces and captured from above by the distal legs.

20. The welder of claim 1 further comprising a welder control located on the inclined surface.

* * * * *

UNITED STATES PATENT AND TRADEMARK OFFICE
CERTIFICATE OF CORRECTION

PATENT NO. : 7,126,084 B2
APPLICATION NO. : 10/850539
DATED : October 24, 2006
INVENTOR(S) : DeYoung Page 1 of 1

It is certified that error appears in the above-identified patent and that said Letters Patent is hereby corrected as shown below:

Col 1, Claim 1, line 6, "die" should read -- the --.

Col 7, Claim 3, line 1, "die" should read -- the --.

Col 7, Claim 5, line 10, "front" should read -- from --.

Col 7, Claim 5, line 17, "he" should read -- be --.

Col 8, Claim 12, line 2, "book" should read -- hook --.

Signed and Sealed this

Second Day of January, 2007

JON W. DUDAS
*Director of the United States Patent and Trademark Office*